Figure 1:
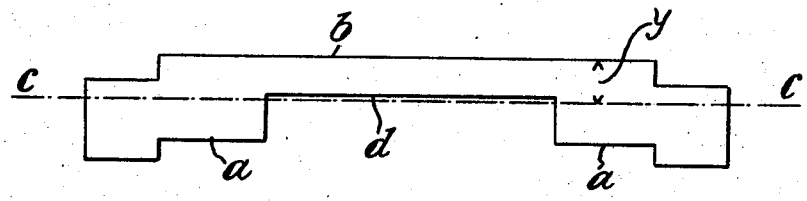

Oct. 12, 1948.  W. R. BERRY  2,450,869
LEAF SPRING
Filed May 2, 1945

Inventor
Walter Richard Berry

Patented Oct. 12, 1948

2,450,869

UNITED STATES PATENT OFFICE 2,450,869

LEAF SPRING

Walter Richard Berry, Leeds, England, assignor to Jonas Woodhead & Sons Limited, Leeds, England Application May 2, 1945, Serial No. 591,459
In Great Britain October 14, 1944

2 Claims. (Cl. 267—47)

This invention relates to leaf springs, such as are commonly employed for the purpose of vehicle suspension and which consist of a plurality of steel plates or leaves superimposed on one another.

It has been shown from a study of the stress and deflection formulae for spring plates that the work done per unit mass for a given maximum tensile stress is completely expressed by the formula $$\frac{I}{Ay^2} \times \text{constant}$$

where:
I is the moment of inertia.
A the cross-sectional area of the plate
y the distance of the tension face from the neutral axis.

Therefore, the factor $$\frac{I}{Ay^2}$$

is the measure of comparative overall efficiency of spring plates. For spring plates of varying section to give the same deflection characteristics and thus be comparable, it is necessary for the moment of inertia to be the same for each section and, therefore, it will be seen from the above formula that any thing which can be done to reduce the cross-sectional area (provided the width of plate is maintained constant) with or without alteration in the distance of the tension face from the neutral axis and without altering the moment of inertia, will result in increased overall efficiency and the spring produced from such sections will be capable of performing the same work at the same or less maximum tensile stress with a saving in weight.

This effect is very desirable even though the compressive stress on the compression surface may be increased thereby, as it is known that failures in spring plates generally start from the tension face and that considerable increase in the compressive stress can be allowed with safety.

It is known that it has already been proposed to obtain this desirable effect by the removal of a certain amount of metal from the compression side by forming a groove or channel symmetrically therein and adding an amount of metal on each side of the channel to compensate for the reduction in the moment of inertia and alteration in the position of the neutral axis which would otherwise result from the removal of the metal to form the channel.

In one form of such plates where the width of the groove or channel is one third of the width of the section an overall efficiency of approximately 124% can be obtained as compared with 100% for the normal concave section or 105% for flat plates all of equal moment of inertia.

The object of the present invention is to provide a plate section of high efficiency which has the further important advantages not possessed by the present grooved or channel section of providing interlocking engagement between the several superimposed plates of the spring, and of preventing leakage of lubricant from the edges of adjacent plates thereof.

Figure 2:
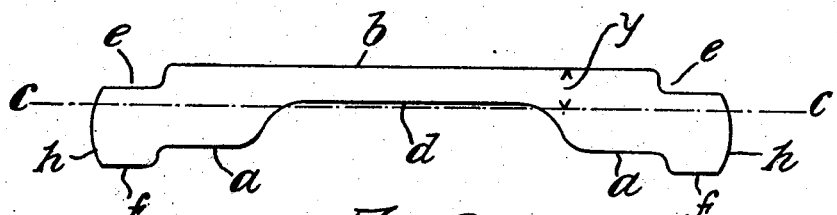
Figure 3:
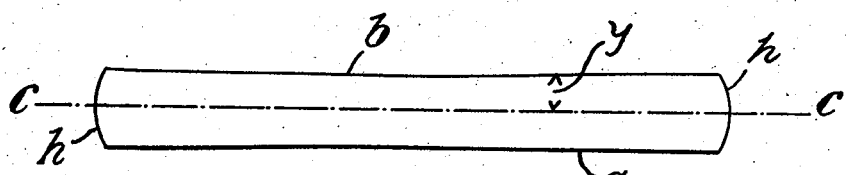
Figure 4:
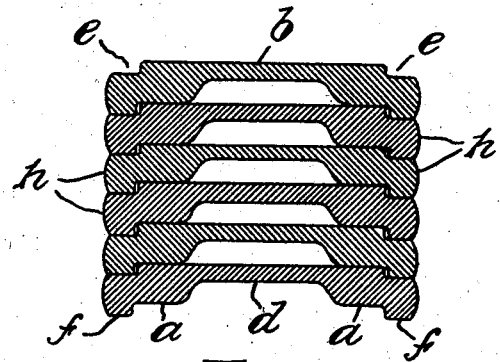

In the accompanying drawing,
Figure 1 represents a theoretical plate section embodying the present invention.
Figure 2 represents a practical form of the improved plate section.
Figure 3 represents a normal plate section for purposes of comparison.
Figure 4 shows how the improved sections interlock with each other when superimposed on one another.

Referring to the drawing, a indicates the compression side, b the tension side and c—c the neutral axis of the section in each case.

The improved section is of the kind in which a central groove or channel d is formed in the compression face. In a section of this kind it has been previously shown that compensation for metal removed in this way can be made by adding metal to the remainder of the compression face. Similar compensation can also be obtained by the removal of metal from the tension face.

Instead, therefore, of compensating by adding all the metal required uniformly on both sides of the groove or channel on the compression face leaving these portions and the tension face substantially flat, it is proposed in this invention to compensate partly by removal of metal from the marginal edges of the tension face and partly by the addition of metal at the marginal edges of the compression face as well as by the uniform adjustment of metal on the portions of the compression face on each side of the groove or channel and the adjustment of the width and/or depth of channel, thus retaining the high efficiency of the channel section while maintaining the same moment of inertia.

As shown in Figures 1 and 2, the improved section, in addition to having a central channel d in the compression side, is formed so as to provide against relative lateral displacement of adjacent plates of similar section, said channel and the marginal edges of the section being so dimensioned and disposed with respect to the neutral axis of the section that, whilst having substantially the same tensile stress and deflection values, the improved section is of less weight than that of the normal rectangular or substantially rectangular plate section.

For the purposes of the invention the marginal edges of the channelled section are stepped out of the plane thereof in such a manner as to form an open-sided groove $e$ in each marginal edge at the tension side of the section and a corresponding rib $f$ on each marginal edge at the compression side, the ribs on one plate being adapted to engage with the grooves in the adjacent plate of the spring.

As already stated, Figure 1 shows the theoretical form of the improved section. For the purposes of manufacture it will, of course, be necessary, as shown in Figure 2, to make the grooves $e$ at the edges of the tension face slightly wider than the ribs $f$ on the compression face to allow for mating after rolling the section. To facilitate rolling it will also be necessary, as shown in the same figure, to taper the sides of the central channel $d$ in the compression face, and in order to avoid stress concentrations all internal angles must be amply radiussed. The edges $h$ of the section may either be rounded, as shown, or square as desired.

Since all these variations from the purely theoretical form influence the final results obtained they must be judiciously arranged and taken into account in determining the efficiency of the improved section.

In comparing the improved section with the normal flat section shown in Figure 3, it must be remembered that the latter is not a true rectangle but is slightly concave on both faces $a$ and $b$ and usually rounded at the edges $h$ to a radius equal to the normal thickness of the plate. The effects of these modifications are that whilst the normal section will have the same value of $y$ for the most highly stressed portions of the tension face $b$ as in the case of the true rectangular section, it will have a smaller moment of inertia and a slightly less weight. Before a true comparison can be made, therefore, between the improved section and the normal flat section due allowance must be made for these modifications of the latter.

As an example of the type of comparison which can be obtained by fixing arbitrarily certain of the variables in the theoretical form shown in Figure 1, Figures 2 and 3 and the following table are given in which corrections have been made for widening the grooves $e$ in the edges of the tension face, sloping of the sides of the central channel $d$ in the compression face, and rounding the edges $h$ to a radius equal to the nominal thickness of the section shown.

| Terms | Standard Concave Section, Figure 3 | Equivalent interlocking Grooved Section, Figure 2 |
| --- | --- | --- |
| Nominal Size | 2½" x 5/16" | 2½" x 0.3118". |
| Cross Section Area | 0.7614 sq. ins | 0.5660 sq. ins. |
| Per Cent Weight Saved | | 25.06. |
| Moment of Inertia | 0.005962 in.⁴ | 0.005990 in.⁴ |
| Stress Factor "$y$" (Tensile) | 0.15625 in | 0.1550 ins. |

It is, of course, appreciated that there is a limit to the adjustment of the width and/or depth of the channel $d$ beyond which there may be a tendency for the plate to buckle under stress.

The method of assembly of plates of the improved section to form a laminated spring is shown in Figure 4 from which it will be seen that, in addition to the high efficiency and weight saving which is obtained by the improved section, there is the important further advantage not possessed by the normal channelled section of the interlocking effect between adjacent plates by the engagement of the ribs $f$ and grooves $e$ on the one plate with the grooves and ribs on adjacent plates, thereby preventing any tendency to relative lateral displacement between the various plates of the spring. At the same time and by the same means an effective leakage of lubricant is prevented from between the edges of adjacent plates.

I claim:

1. A plate for laminated springs having a tension face and a compression face; open side grooves at the marginal edges of said tension face; a central longitudinal groove extending partly across said compression face; and downward stepped ribs along the marginal edges of said compression face so as to provide for interlocking engagement with adjacent plates of similar shape.

2. In a laminated spring in combination a plurality of superimposed plates having each a tension face and a compression face; a central longitudinal channel in each of said superimposed plates extending partly across said compression face of the same; ribs forming part of each of said superimposed plates and extending along the marginal edges of said compression face of the same; and stepped down portions forming part of each of said superimposed plates extending in said tension face of said plate along each marginal edge thereof; said stepped down portions and said ribs of said superimposed plates being constructed and arranged so as to be complementary to each other so that when said plates are assembled and superimposed said ribs of said plates engage and interlock said stepped down portions in adjacent plates so as to prevent relative lateral displacement of said superimposed plates.

WALTER RICHARD BERRY.

REFERENCES CITED

The following references are of record in the file of this patent:

UNITED STATES PATENTS

| Number | Name | Date |
| --- | --- | --- |
| 1,546,584 | Hutt | July 21, 1925 |
| 1,730,700 | Wallace | Oct. 8, 1929 |
| 1,772,935 | Gylling | Aug. 12, 1930 |
| 1,813,617 | Fries | July 7, 1931 |

FOREIGN PATENTS

| Number | Country | Date |
| --- | --- | --- |
| 41,486 | Netherlands | Sept. 15, 1937 |
| 365,985 | Great Britain | Jan. 28, 1932 |
| 446,362 | Germany | June 29, 1927 |